No. 883,116.

PATENTED MAR. 24, 1908.

C. P. MITCHELL.
TWINE WINDING MACHINE.
APPLICATION FILED FEB. 9, 1898.

5 SHEETS—SHEET 2.

Witnesses:
Walter E. Lombard
Charles B. Choate

Inventor:
Charles P. Mitchell,
by N. C. Lombard
Atty.

No. 883,116. PATENTED MAR. 24, 1908.
C. P. MITCHELL.
TWINE WINDING MACHINE.
APPLICATION FILED FEB. 9, 1898.

5 SHEETS—SHEET 3.

Witnesses:
Walter E. Lombard.
Charles B. Choate.

Inventor:
Charles P. Mitchell,
by N. C. Lombard
Atty.

No. 883,116. PATENTED MAR. 24, 1908.
C. P. MITCHELL.
TWINE WINDING MACHINE.
APPLICATION FILED FEB. 9, 1898.
5 SHEETS—SHEET 4.
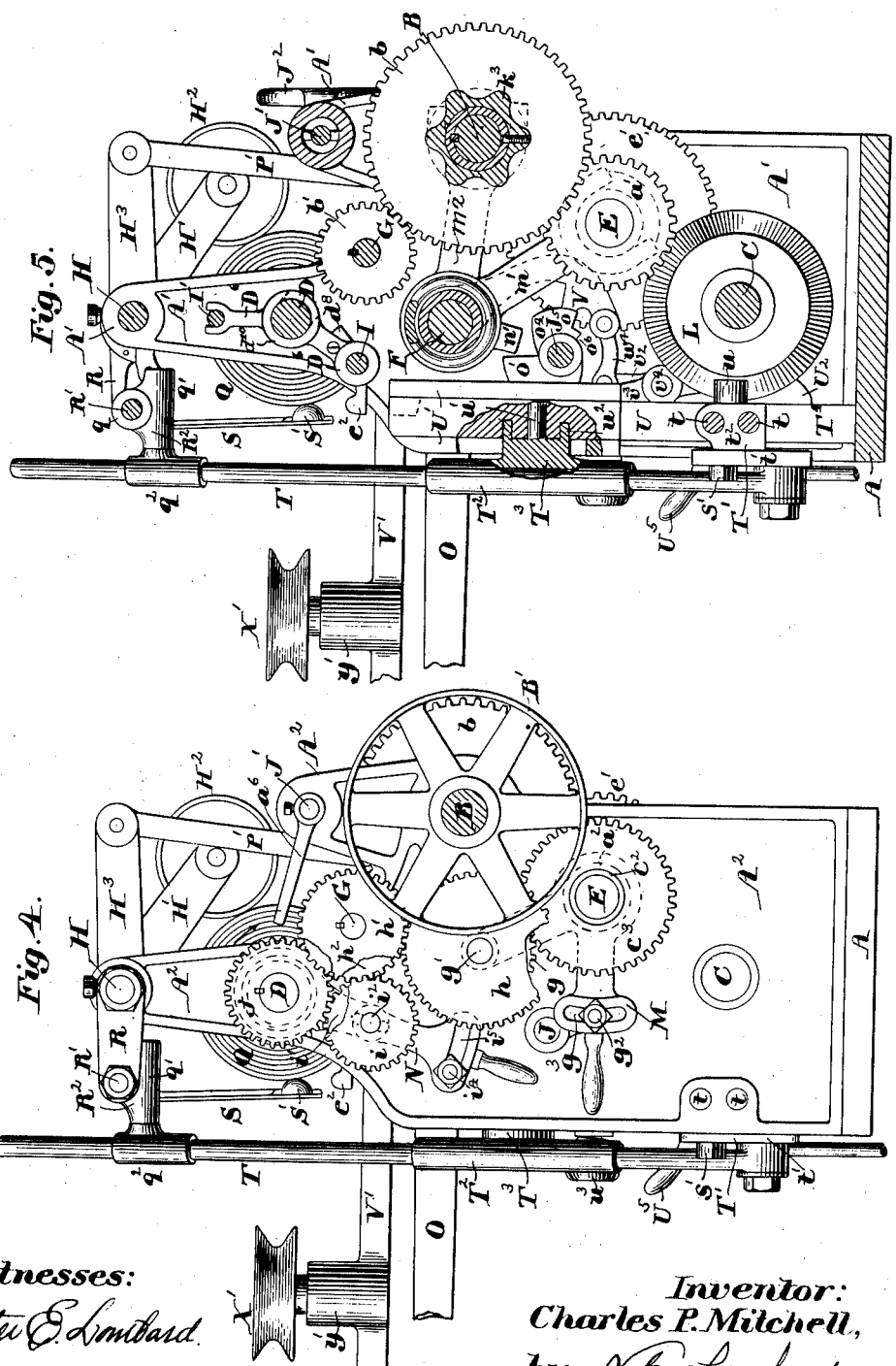
Witnesses:
Walter E. Lombard
Charles B. Choate
Inventor:
Charles P. Mitchell,
by N. C. Lombard
Atty.

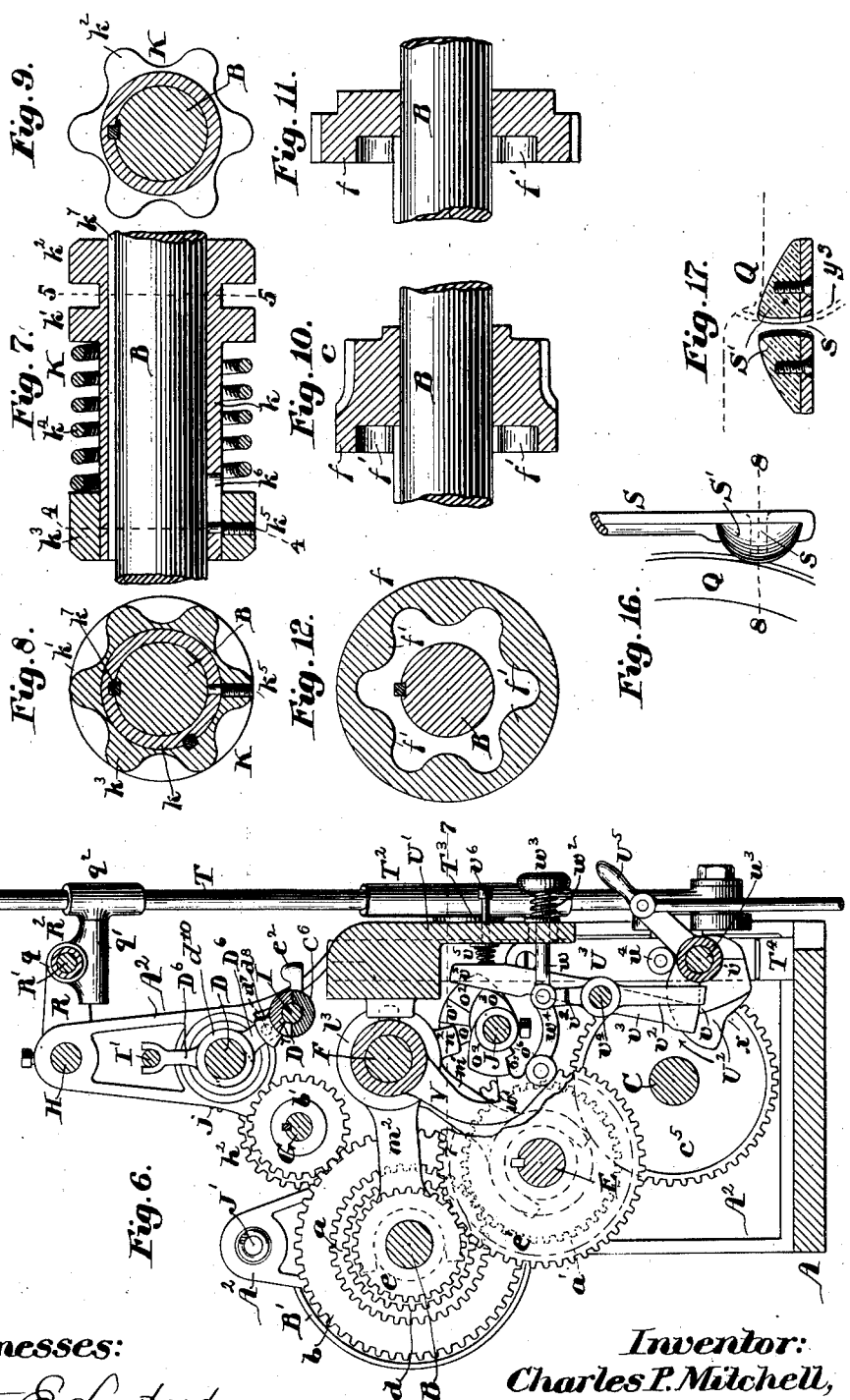

UNITED STATES PATENT OFFICE.

CHARLES PAUL MITCHELL, OF BOSTON, MASSACHUSETTS.

TWINE-WINDING MACHINE.

No. 883,116.  Specification of Letters Patent.  Patented March 24, 1908.

Application filed February 9, 1898. Serial No. 669,659.

*To all whom it may concern:*

Be it known that I, CHARLES PAUL MITCHELL, of Boston, in the county of Suffolk and State of Massachusetts, have invented certain new and useful Improvements in Twine-Winding Machines, of which the following, taken in connection with the accompanying drawings, is a specification.

This invention relates to twine winding machines and it consists in certain novel features of construction, arrangement, and combination of parts which will be readily understood by reference to the description of the accompanying drawings and to the claims hereto appended and in which the invention is clearly pointed out.

Figure 1:
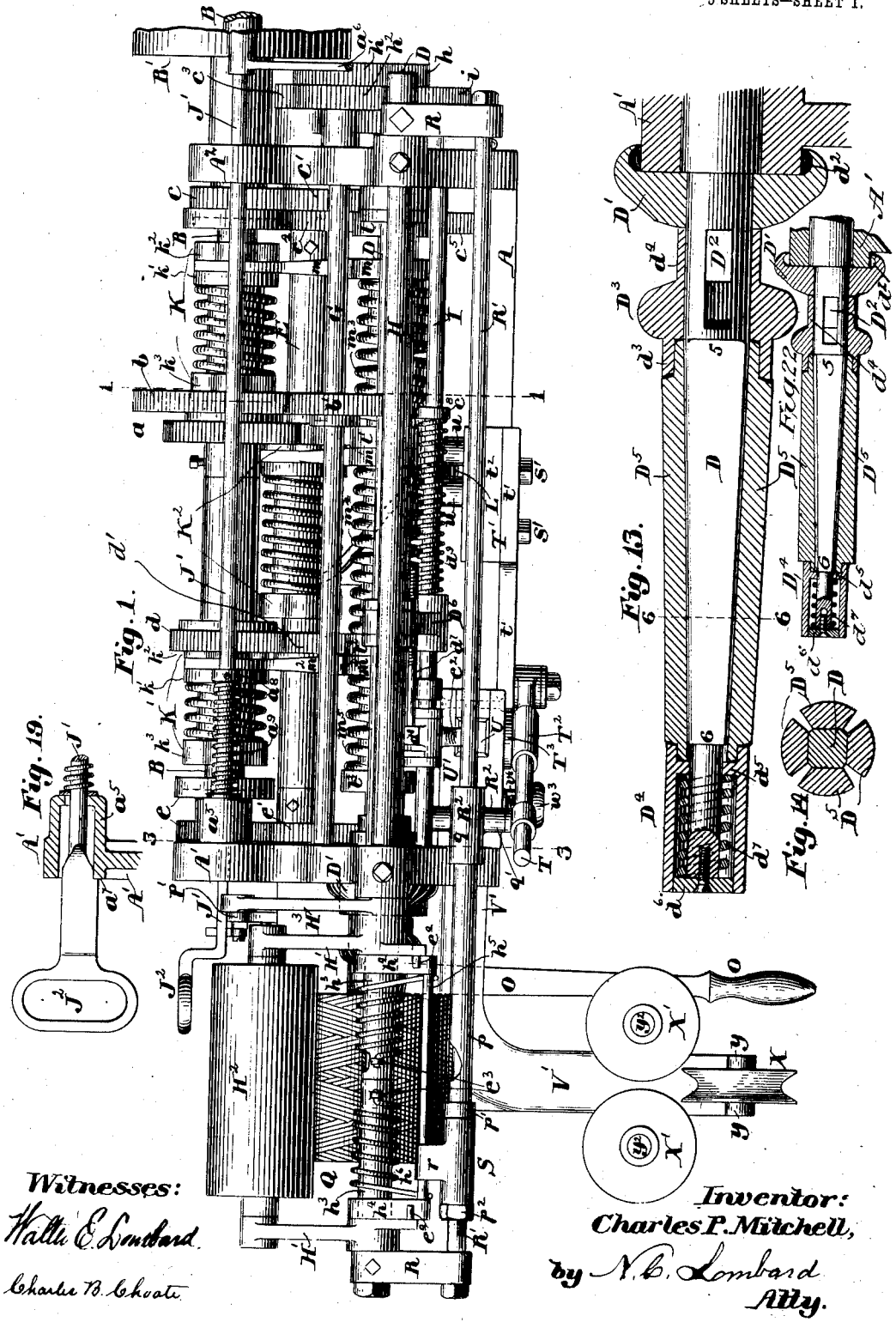
Figure 2:
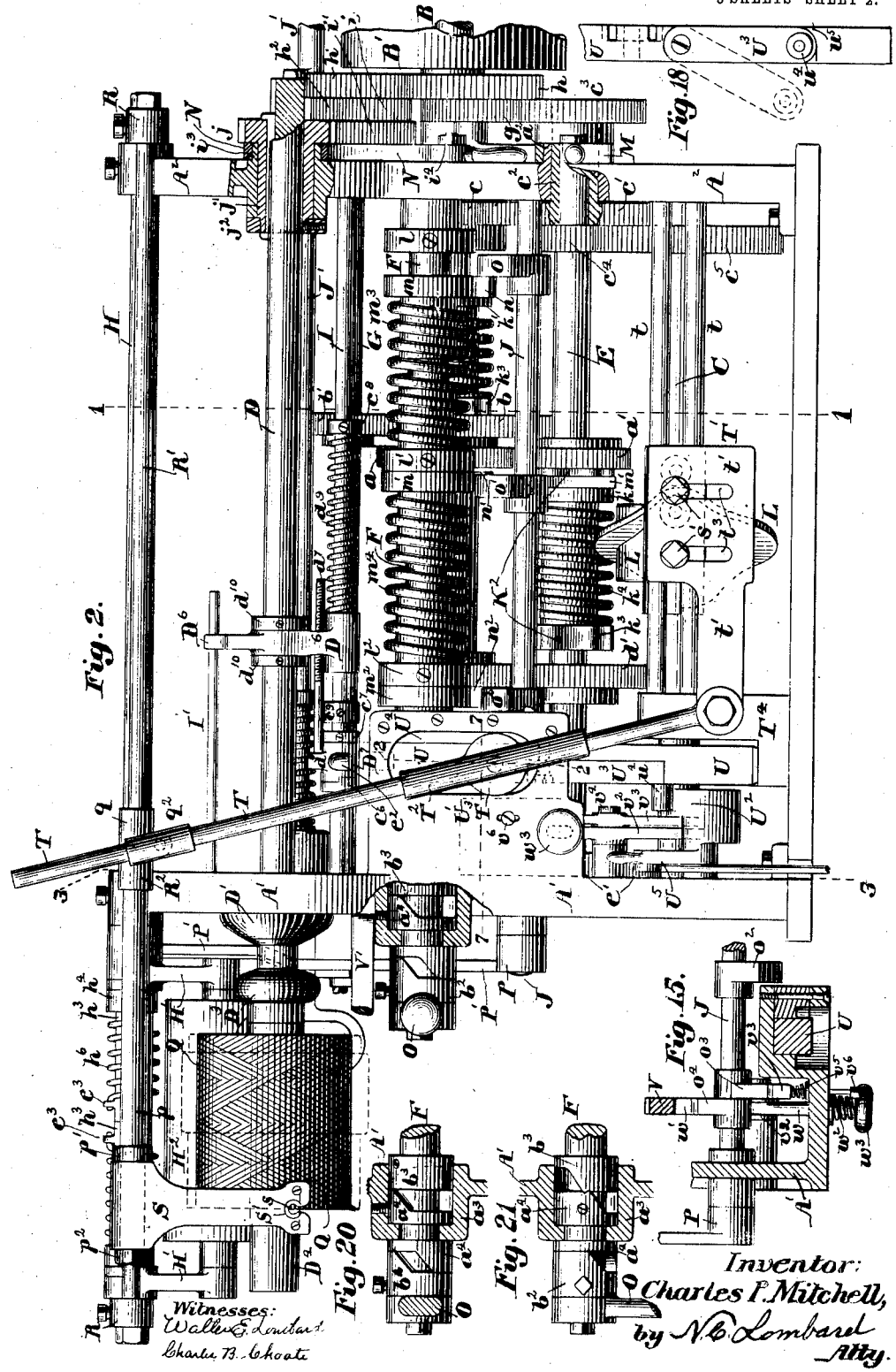
Figure 3:
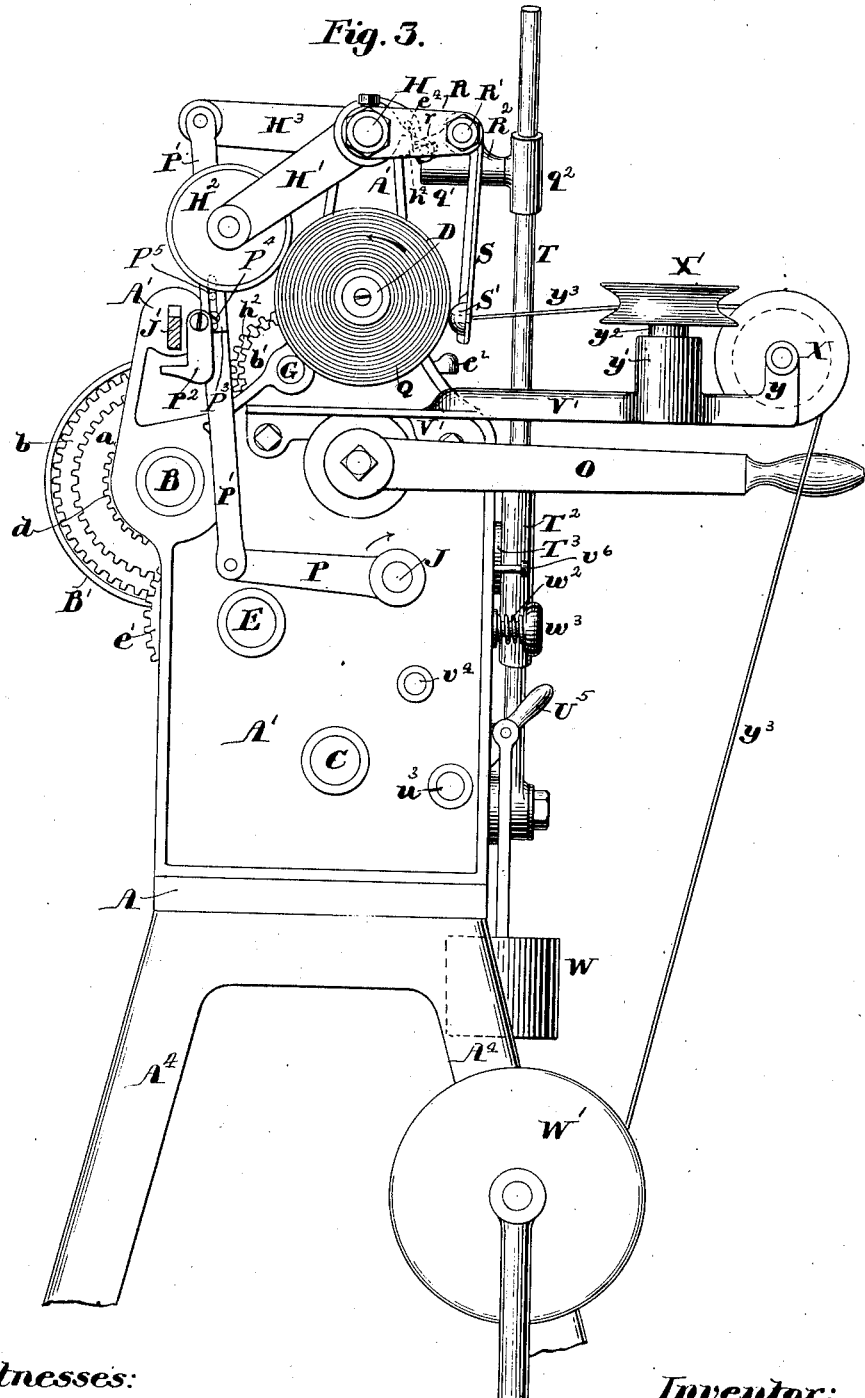

Figure 1 of the drawings is a plan of a machine embodying the principles of this invention with a portion of the driving pulley broken away. Fig. 2 is a front elevation of the same, certain parts thereof being broken away while other parts are shown in section. Fig. 3 is an elevation of the left end of the machine as shown in Fig. 2. Fig. 4 is an elevation of the opposite end. Fig. 5 is a vertical transverse section on line 1—1 of Figs. 1 and 2 with a small portion cut in section on line 2—2 of Fig. 2 and looking towards the left of said figures. Fig. 6 is a transverse vertical section on line 3—3 of Figs. 1 and 2 and looking toward the right of said figures. Fig. 7 is a central longitudinal section of the male portion of one of the clutches on the driving shaft. Fig. 8 is a sectional elevation of the same looking toward the right of Fig. 7, the cutting plane being on line 4—4 on said figure. Fig. 9 is a similar section on line 5—5 of Fig. 7 looking toward the right of said figure. Figs. 10, 11 and 12 are sections of the female portions of the clutches arranged to coöperate with the parts shown in Figs. 7, 8 and 9. Fig. 13 is a sectional elevation of the mandrel upon which the cop is wound. Fig. 14 is a transverse section of the same on line 6—6 of Fig. 13. Fig. 15 is a partial horizontal section on line 7—7 of Fig. 2. Fig. 16 is an elevation of the lower portion of the twine guiding and delivering arm showing its relation to the periphery of the cop, and Fig. 17 is a section of said arm and its eye on the line 8—8 of Fig. 16. Figs. 18, 19, 20 and 21 are details to be hereinafter referred to. Fig. 22 illustrates a modification of the mandrel shown in Fig. 13. Figs. 7, 8, 9, 10, 11, 12, 13, 14, 15 and 16 are drawn to an enlarged scale.

In the drawings, A is the base plate or bed of the head of the machine to which are firmly bolted the upwardly projecting end frames $A^1$ and $A^2$ in suitable bearings in which are mounted the driving shaft B, the cam shaft C, the cop carrying shaft D, and the shafts E, F, G, H, I, and J and the shipper rod $J^1$.

The shaft B has mounted upon one end thereof the pulley $B^1$ firmly secured thereto, a portion of which is broken away in the drawing, and a loose pulley not shown, and between the frames $A^1$ and $A^2$ has firmly secured thereon the spur gear wheel $a$ which meshes into and imparts motion to the spur gear wheel $a^1$ mounted loosely upon the shaft E. The shaft B also has mounted loosely thereon the spur gear wheels $b$, $c$, $d$, and $e$, each of which constitutes, or is connected to, the female portion of a clutch, with which one end or the other of the male portion of a clutch, as K or $K^1$ constructed substantially as shown in Figs. 7, 8 and 9, engages to compel said gears to revolve with said shaft B.

The female portions of the clutches connected with or forming parts of the gears $b$, $c$, $d$, and $e$ consist of annular lips $f$ having a corrugated inner surface in the form of a series of inwardly projecting teeth as $f^1$ shown in Figs. 10, 11 and 12.

The male portions K and $K^1$ of the clutches are each composed of a sleeve $k$, the circular collar $k^1$, and the toothed collar $k^2$, all made in one piece, the toothed collar $k^3$, fitted to and movable endwise upon said sleeve $k$ to a limited extent, and the coiled spring $k^4$ surrounding said sleeve $k$ between the collars $k^1$ and $k^3$. The purpose of this movement of the collar $k^3$ is to permit said collar to yield against the tension of the spring $k^4$ when said male portion K or $K^1$ is moved along its shaft to cause an engagement with the female clutch member of the gears $b$ or $e$ until the outlines of said female clutch member and said collar $k^3$ coincide, when the spring $k^4$ will act to force said collar $k^3$ into said female clutch member.

The movement of said collar $k^3$ upon said sleeve is limited by the pin $k^5$ set in said collar $k^3$ and projecting into the slot $k^6$ formed in said sleeve. The sleeves $k$ are connected to the shaft B so as to be revoluble therewith and movable endwise thereon by means of a key $k^7$ and a suitable keyway, all as shown in Figs. 7, 8 and 9.

The teeth of the gear wheel $b$ engage with the teeth of the gear wheel $b^1$ mounted upon and firmly secured to the shaft G as shown in Figs. 1, 5 and 6. The gear $c$ engages the gear $c^1$ mounted loosely upon the shaft E and provided with a sleeve-like hub $c^2$ which projects through the frame $A^2$ and has secured upon its outer end the gear wheel $c^3$ as shown in Fig. 2.

The gear $d$ engages the gear $d^1$ mounted loosely upon the shaft E, and the gear $e$ engages the gear $e^1$ mounted upon and firmly secured to the shaft E as shown in Figs. 1 and 6. The shaft E has firmly secured thereon, just inside the gear $c^1$, the pinion $c^4$ which meshes into and imparts motion to the gear wheel $c^5$, firmly secured upon the shaft C upon which is also firmly secured the cam L, as shown in Figs. 2 and 5.

The gears $a^1$ and $d^1$, mounted loosely on the shaft E have formed in their opposing faces, recesses or sockets, as shown in Figs. 11 and 12 to receive one or the other end of the male portion of a clutch $K^2$, shown in Fig. 1, said male clutch portion being constructed, and connected to said shaft, substantially as shown in Figs. 7, 8 and 9. The gear $c^3$ engages the gear $g$ mounted loosely upon a stud $g^1$, set in the elbow lever M mounted upon and adjustable about the hub $a^2$ of the frame $A^2$ and clamped in its adjusted position by the clamping bolt $g^2$ set in said frame $A^2$ and extending through the slot $g^3$ in said lever as shown in Figs. 2 and 4. The gear $g$ has secured thereto, so as to revolve therewith, the gear $h$ which in turn engages the gear $h^1$, firmly secured upon the end of the shaft G. The gear $h^2$ also secured upon said shaft in close proximity to said gear $h^1$ engages the gear $i$ secured to and mounted with the gear $i^1$, loosely upon a stud $i^2$ set in the lever N. The lever N in turn is mounted upon and adjustable about the hub $i^3$ of the frame $A^2$ and secured in the desired position by the clamping bolt $i^4$ which passes through the slot $i^5$ and screws into the frame $A^2$ as shown in Figs. 2 and 4. The gear $i^1$ engages the gear $j$, keyed upon the end of the shaft D, in such a manner as to revolve therewith, and at the same time permit the said shaft to be moved endwise through said gear, which is provided with a sleeve-like hub $j^1$, which projects through the frame $A^2$ and has secured upon its inner end the collar $j^2$, all as shown in Fig. 2.

The shaft F has firmly secured thereon in fixed positions, the collars $l$, $l^1$, $l^2$, and $l^3$ each provided with a sleeve-like hub projecting therefrom toward the right of Figs. 1 and 2, and between said fixed collars are loosely fitted upon said shaft the shipper arms $m$, $m^1$, and $m^2$ each provided with a sleeve-like hub projecting toward the left of Figs. 1 and 2. The forked end of the shipper arm $m$ engages the circumferential groove between the collars $k^1$ and $k^2$ of the clutch K on shaft B and its hub is provided with the lug $n$, projecting below the periphery of said hub, as shown in Fig. 2. The forked end of the shipper arm $m^1$ engages the groove between the collars $k^1$ and $k^2$ of the clutch $K^2$, on shaft E, and its hub is provided with the downwardly projecting lug $n^1$, and in like manner the forked end of the shipper arm $m^2$ engages the groove between the collars $k^1$ and $k^2$ of the clutch $K^1$ on shaft B, and its hub is provided with the lug $n^2$, all as shown in Figs. 2 and 6. The hubs of the shipper arm $m$ and the collar $l^1$ are surrounded by the spring $m^3$, the tension of which tends to press said shipper arm hard against the collar $l$. The hubs of the shipper arm $m^1$ and the collar $l^2$ are surrounded by the spring $m^4$ which presses the shipper arm $m^1$ toward the collar $l^1$, and in like manner the hubs of the shipper arm $m^2$ and the collar $l^3$ are surrounded by the spring $m^5$ which presses the shipper arm toward the collar $l^2$, all as shown in Figs. 1 and 2.

The shaft F projects through a chambered hub $a^3$ of the frame $A^1$, and through the double cam-faced cylindrical collar $a^4$, secured in a fixed position to said hub, and has firmly secured thereto so as to rotate therewith the two cylindrical cams $b^2$ and $b^3$, arranged one at each side of the fixed cam $a^4$, (see Figs. 20 and 21) and has its outer end squared. To this squared section of said shaft is fitted so as to be easily detached therefrom the hand lever O, by depressing which the shaft F may be partially rotated and moved endwise toward the left of Fig. 2 a distance equal to the throw of said cam $b^2$, carrying with it the collars $l$, $l^1$, $l^2$, and $l^3$, the shipper arms $m$, $m^1$, and $m^2$ and the springs $m^3$, $m^4$, and $m^5$, said shipper arms $m$, $m^1$, and $m^2$ moving the male clutch sections K, $K^1$, and $K^2$ towards the left of Figs. 1 and 2 into engagement with the female clutch sockets formed in, or connected with the gears $b$, $e$, and $d^1$ as will be more particularly described hereinafter.

The shaft J has secured thereon, in fixed positions, the locking segments $o$, $o^1$ and $o^2$, constructed and arranged to be moved into positions at the right of the lugs $n$, $n^1$, and $n^2$ of the shipper arms $m$, $m^1$, and $m^2$ when said arms are moved toward the left of Figs. 1 and 2 with the shaft F as above described, and to lock said shipper arms against movement towards the right of said figures when said shaft F is returned to its normal position by raising said lever O. The shaft J also has secured thereon so as to rotate therewith the cam $o^3$ and the locking arm $o^4$ provided with the shoulders $o^5$ and $o^6$, (see Figs. 5 and 6) and has secured upon its lefthand end the lever P, the office and operation of which will be hereinafter decsribed.

The shaft D extends through the frame $A^1$ to a considerable distance, has fixed thereon, just outside of the hub of said frame, the collar $D^1$, which projects over said hub and has formed in the inner surface of said overhanging portion, the annular groove $d^2$, which serves to catch any oil that may drip from the outer end of the bearing of said shaft (see Fig. 13). Just outside of the collar $D^1$, the shaft D is made cylindrical for about two inches, more or less, in length, and has cut through it the slot $D^2$. The slot $D^2$ is partly covered by the collar $D^3$ provided on its outer end with the annular lip $d^3$ and upon its inner end with the thin sleeve-like hub $d^4$ through which is cut a slot coinciding with the inner portion of, but of less length than the slot $D^2$ in said shaft D. The shaft D, from the point 5 to the point 6, is made tapering and flat sided, or nearly square in cross section, as shown in Figs. 13 and 14, and from the point 6 to its end it is made cylindrical and of a diameter somewhat less than the thickness of the smallest end of the tapered portion and upon this cylindrical portion is fitted the cylinder $D^4$ provided near its inner end with the inwardly projecting annular flange $d^5$ which encompasses the cylindrical end of the shaft D, and between said flange $d^5$ and the head $d^6$ secured to the end of said shaft, said shaft is surrounded by the coiled spring $d^7$ which tends to press said cylinder $D^4$ towards the frame $A^1$.

$D^5$, $D^5$ are lags of metal or wood, as preferred, fitted to the tapered flat sides of the shaft D and having their outer surfaces concentric with the axis of said shaft and their end portions reduced in thickness to permit the inner end of the cylinder $D^4$ and the annular lip $d^3$ to extend over said lags to retain them in place as shown in Fig. 13. The outer surface of the lags $D^5$ may be parallel to the tapered surface of the shaft D as shown in Fig. 13 or parallel to the axis of said shaft, as shown in Fig. 22, for winding tapered, or cylindrical cops, or both. These lags $D^5$ constitute the mandrel-surface upon which the cop is to be wound.

The shaft or rod H is secured in a fixed position in the frames $A^1$ and $A^2$ to serve as a tie rod between said frames, but extends beyond the frame $A^1$ and has loosely mounted thereon a pair of two-armed levers $H^1$—$H^1$, in bearings in the long arms of which is mounted the light roll $H^2$, the periphery of which rests upon the mandrel $D^5$, or the cop being wound thereon as shown in Fig. 3, in which, and Figs. 1, 2, 4 and 5, Q represents a partly finished cop. The shaft H also has mounted thereon the lever $H^3$, formed in one piece with, or firmly secured to, one of the levers $H^1$, the movable end of which is connected by the link $P^1$ to the lever P (see Fig. 3). The levers $H^1$—$H^1$ are provided with sleeve-like hubs $h^3$—$h^3$, which project toward and abut against each other intermediate of the arms thereof and each of said hubs has loosely mounted thereon, so as to be movable about said hub, an arm $h^4$.

The outer or movable ends of said arms $h^4$ are connected by the rod $h^5$, and each of said hubs $h^3$ has mounted thereon a spiral spring $h^6$ one end of which is connected to an eye $e^3$ formed on said hub and the other end is connected to the rod $h^5$ in such a manner that the tension of said springs will tend to lift said rod and the outer ends of the arms $h^4$ and keep said arms in contact with the limiting pins $e^4$ set in the short arms of the levers $H^1$, all as shown in Figs. 1, 2 and 3.

The shaft or rod H has firmly secured to each end thereof in a normally fixed but adjustable position a radius arm R, the outer ends of which are connected by the rod $R^1$, upon which is fitted so as to be movable endwise upon said rod, but non-revoluble thereon, the sleeve $p$ provided with the collar $p^1$, and the nut $p^2$, and having formed in one piece therewith or secured thereto the casting $R^2$, composed of the two cylindrical hubs $q$ and $q^1$, the axes of which are at right angles to each other but in different horizontal planes as shown in Figs. 1, 2, 3 and 4.

The sleeve $p$ has mounted thereon between the collar $p^1$ and nut $p^2$ so as to be movable about said sleeve, the thread or twine guiding and delivering arm S, said arm being provided with the short arm $r$, the forked end of which engages the rod $h^5$, and is operated upon thereby to retain the twine guiding arm S in engagement with the periphery of the cop as shown in Figs. 1 and 3. The lower end of the arm S is provided with a transverse dovetailed groove in which is fitted the porcelain or hardened steel block $S^1$ having a convex bearing surface to rest against the cop and provided with a twine guiding eye S extending through the center of said convex surface, and also through the lower end of the arm S as shown in Figs. 2, 16 and 17. The hub $q^1$ of the casting $R^2$ has pivoted thereto the sleeve-like hub $q^2$, fitted to the cylindrical lever T, the lower end of which is pivoted to the reciprocating carriage $T^1$ mounted upon the guide rods $t$—$t$, supported at one end in bearings in the frame $A^2$ and at their other ends in the stand $T^4$. The carriage $T^1$ is made in two parts $t^1$ and $t^2$, the part $t^1$ being adjustably secured to the part $t^2$ by means of the bolts $s^1$—$s^1$, which pass through the slots $t^3$—$t^3$ formed in the part $t^1$, and screw into the part $t^2$, as shown in Figs. 2 and 5. This adjustment of the part $t^1$ on the part $t^2$ provides a means for adjusting the length of traverse of the guide arm S lengthwise of the cop. The part $t^2$ of the carriage $T^1$ has set in its inner side two studs upon which are mounted the rolls $u$—$u$, upon which the cam L acts to reciprocate said carriage $T^1$ as shown in Figs. 1, 2 and 5.

The lever T has fitted thereon so as to be movable endwise thereof, the sleeve $T^2$ having formed thereon the hub $T^3$ provided on its rear with the pintle $u^1$ to fit a bearing in the vertical fulcrum bar U and also with the annular lip $u^2$ which engages two segmental grooves formed in said bar U as shown in Fig. 5, said pintle $u^1$ forming the fulcrum about which the lever T moves when the carriage $T^1$ is reciprocated.

The fulcrum bar U is mounted in a suitable bearing in the stand or bracket $U^1$ formed in one piece with, or firmly secured to, the frame $A^1$, and is movable vertically therein by means of the cam or lifter toe $U^2$ mounted upon the stud $u^3$ set in the frame $A^1$ and constructed and arranged to act upon the roll $u^4$ mounted on a stud set in the lower end of the plate $U^3$ pivoted at its other end to said bar U, said plate fitting and just filling a recess formed in the side of said bar, and normally remaining in the position shown in Fig. 6, and in full lines in Fig. 18. The plate $U^3$ may be moved about its pivot towards the rear as indicated in dotted lines in Fig. 18 to permit the return of the lifter toe $U^2$ to its original position as shown in Fig. 6, but cannot be moved about said pivot towards the front, beyond a perpendicular position, because of the stop $u^5$, (see Fig. 18.)

The stand or bracket $U^1$ has cut through its front portion the slot $U^4$ for the passage of the hub $T^3$ and to permit said hub to be raised with the fulcrum bar U, as shown in Figs. 2 and 6. The cam or lifter toe $U^2$ has formed on its side towards the frame $A^1$, the shoulders $v$ and $v^1$ which engage respectively with the lower ends of the stop levers $v^2$ and $v^3$ at the proper time to limit the movement of said lifter toe when operated by the descent of the weight W suspended from the handle $U^5$, connected to said lifter toe, as shown in Figs. 2, 3 and 6.

The levers $v^2$ and $v^3$ are mounted side by side upon the stud $v^4$ set in the frame $A^1$ and the upper arm of the lever $v^3$ is pressed into contact with the cam $o^3$ by the coiled spring $v^5$ surrounding the screw stud $v^6$ between said lever and the bracket $U^1$ as shown in Fig. 6. The upper end of the lever $v^2$ is pivoted to the end of the rod $w$, said rod being in turn connected by a link $w^4$ to the locking arm V mounted upon and movable about the shaft F near the frame $A^1$ and provided with the hook-like shoulder $w^1$. When the shoulder $o^5$ of the arm $o^4$ is raised to a given point by the rotation of the shaft J in the direction indicated by the arrow on Fig. 3, caused by the rise of the roll $H^2$ as the cop is built up, the shoulder $w^1$ is moved toward the front of the machine by the reaction of the spring $w^2$ surrounding the rod $w$ between the bracket $U^1$ and the push button $w^3$ secured to the outer end of said rod, said bracket $U^1$ being slotted for the passage of said rod $w$ as shown in Figs. 2 and 6. The bed plate A may be mounted upon legs $A^4$ as shown in Fig. 3 or it may rest upon a bench.

$V^1$ is a bracket bolted to the end frame $A^1$ and projecting toward the front, is provided with two ears $y$—$y$, in bearings in which is mounted the sheave X. Said bracket is also provided with the upwardly projecting bosses $y^1$—$y^1$, in each of which is set a stud $y^2$ upon which is mounted a sheave $X^1$. A spool $W^1$ is mounted upon an arbor in any suitable manner, and from this spool the twine $y^3$ is drawn to be wound into a cop, said twine passing over the sheave X, between the sheaves $X^1$, and through the twine guiding eye $s$ to the mandrel or cop.

The shipper rod $J^1$ operates in an enlarged bearing in the inner end of the hub $a^5$ on the frame $A^1$ (as shown in Fig. 19) and in the frame $A^2$ so as to be movable endwise therein and carries at one end a shipper fork $a^6$ one prong of which is shown in Fig. 1 while the other prong is shown in Fig. 4. The opposite end of said rod is provided with the looped handle $J^2$ and between said handle and the chamber of the hub $a^5$ said rod is made flat sided and is provided upon its under edge with the shoulder $a^7$ which engages the lower edge of the opening in the frame $A^1$ to lock said shipper rod in position with the driving belt upon the tight or driving pulley $B^1$. The rod $J^1$ has secured thereon the collar $a^8$ and is surrounded between said collar and the hub $a^5$ by the spring $a^9$ the tension of which will move said rod toward the right of Fig. 1 when the handle end of said rod is lifted to disengage the shoulder $a^7$ from the frame $A^1$.

When it is desired to build a belt or section of less length than the main body of the cop and locate said belt at one side of the center of the cop, the shaft D is moved the desired distance towards the left of Figs. 1 and 2 and the traverse of the twine guiding arm is reduced. To enable said shaft D to be readily and automatically moved toward the left of Figs. 1 and 2 at the desired time in the building of the cop, two collars $d^{10}$—$d^{10}$ are secured on said shaft between which collars said shaft is embraced by the arm $D^6$. Said arm $D^6$ is mounted upon and movable endwise of the shaft I and the rod $I^1$ and has fitted to a threaded bearing therein the stop screw $d^7$, the left hand end of which abuts against the lug $d^8$ on the cylinder $D^7$. This cylinder $D^7$ is mounted upon the shaft I so as to be movable about its axis to cause the lug $d^8$ to be moved upwardly from the path of the stop screw $d^7$ but is prevented from being moved endwise thereon by the collars $c^6$ and $c^7$. By this means the shaft D is maintained in its normal position, or the position shown in the drawings, until the lug $d^8$ is moved around the axis of the shaft I to disengage it from contact with the stop screw $d^7$. Then the tension of the spring $d^9$ surrounding the shaft I between the hub of the arm $D^6$ and the collar $c^8$ fixed on said shaft I will move said arm $D^6$ and the shaft D towards the left of Figs. 1 and 2 until arrested by the hub of the arm $D^6$ coming in contact with the collar $c^9$ adjustably secured upon said shaft I as shown in Figs. 1 and 2.

The movement of the lug $d^8$ around the axis of the shaft I to disengage it from contact with the stop screw $d^7$ to permit the reaction of the spring $d^9$ to move the arm $D^6$ and the shaft D toward the left of Figs. 1 and 2 is accomplished by the upper end of the fulcrum bar U coming in contact with and moving the arm $e^2$ about the axis of said shaft, when said bar is moved upward to adjust the fulcrum of the lever T, and thus diminish the travel of the twine guiding arm S; the cylinder $D^7$, the lug $d^8$ and the arm $e^2$ being formed in one piece. When the shoulder $v^1$ has come into contact with the lever $v^2$ the lifter toe $U^2$ has moved the fulcrum bar U into contact with the arm $e^2$ to cause a shifting of the shaft D.

The arm $e^2$ of the cylinder $D^7$ is so constructed as to over-balance the lug $d^8$ so that when the fulcrum bar U descends and the shaft D is returned by the hand of the operator to the position shown in the drawings, the cylinder $D^7$ will be turned upon its shaft I by the force of gravity to move the lug $d^8$ into a position to be engaged by the end of the stop screw $d^7$ and is registered in this position by shoulders on $D^7$ and $c^6$ coming in contact, when said stop screw has been moved towards the right by the retraction of the shaft D The gears $a$, $d$, and $e$, on the shaft B are so proportioned to the gears $a^1$, $d^1$ and $e^1$, on the shaft E, with which they respectively engage, that each pair, when engaged by the proper clutch or clutches, will impart to said shaft E a different speed from that imparted thereto by either of the other pairs of said gears. The gear $c^4$ on shaft E is one-half the size of gear $c^5$ on the cam shaft C, and the gear $b$ on shaft B is twice the size of the gear $b^1$ on the shaft G. As the gears $h^2$, $i$, $i^1$, and $j$ connecting the shafts G and D are proportioned relative to each other as follows, viz: the diameter of the gear $i$ being ten-elevenths of the gear $h^2$ and the diameter of the gear $i^1$ being equal to eleven-twelfths of the gear $j$, it follows that the shaft D will make one hundred and twenty-one revolutions while shaft G is making one hundred and twenty revolutions. In this connection it is to be noted that the cop hereinafter described is wound with a band or shorter section formed centrally thereon which operation does not require the endwise movement of the winding shaft D previously described; and further, to simplify the description of the operation of the machine the second and third sections of said cop are differentiated by changing the number of reciprocations of the guide arm at predetermined times. The fourth section of said cop is differentiated from the previous sections by changing the number of rotations of the winding member at a predetermined time and the fifth and sixth sections, namely the band and its covering, are differentiated by changing the length of traverse of the guide arm.

The drawings represent the several parts of the machine in the positions they assume when a cop Q has been built up to about the finish of the third section thereof.

The operation of my invention is as follows: Assuming that it is desired to begin to build a new cop having four sections of equal length and a band or fifth section of less length wound centrally thereon, the first thing to be done is to remove the cop that has previously been formed and is still upon the mandrel. To accomplish this the roll $H^2$ is raised until the arm $o^4$ on the shaft J is moved upward about the axis of said shaft sufficiently far to permit the shoulder $w^1$ of the locking arm V to pass beneath the shoulder $o^5$ or $o^6$, of said arm $o^4$, whereby said roll will be held in said raised position until released. The operator then drives a tapered key of suitable width into the slot $D^2$ between the collars $D^1$ and $D^3$ on the shaft D to move the collar $D^3$, the cylinder $D^4$ and the lags $D^5$ towards the left end of the shaft D against the tension of the spring $d^7$ when the lags $D^5$ will collapse and permit the cop to be easily removed. The tapered key is then removed from the slot $D^2$ when the tension of the spring $d^7$ will return the cylinder $D^4$, lags $D^5$ and the collar $D^3$ to their normal positions, as shown in Fig. 13. The hand lever O is then pushed downward to move the shaft F endwise toward the left of Fig. 2 by the action of the cam $b^2$ on collar $a^4$, thus moving the shipper forks $m$, $m^1$, and $m^2$ and the clutches K, $K^1$, and $K^2$ in the same direction causing said clutches to engage the gears $b$ and $e$ on shaft B and the gear $d^1$ on shaft E, respectively. The handle $U^5$ and the weight W are then raised by the operator to place the cam or lifter toe $U^2$ in the position shown in Fig. 6 this movement of the cam or lifter toe $U^2$ causing the member $U^3$ to be moved about its pivot into the position shown in dotted lines in Fig. 18, said member $U^3$ returning by gravity to its normal position as soon as the lifter toe $U^2$ passes beneath it. Then the push button $w^3$ is moved by hand inward to disengage the shoulder $w^1$ of the hook arm V from beneath the arm $o^4$, when the force of gravity will cause the roll $H^2$ to descend into contact with the mandrel, thereby moving the shaft J about its axis in the direction opposite to that indicated by the arrow on Fig. 3 and carrying the locking segments $o$, $o^1$, and $o^2$, respectively, into positions immediately to the right of the lugs $n$, $n^1$, and $n^2$ on the hubs, respectively, of the shipper arms $m$, $m^1$, and $m^2$. This movement of the shaft J causes a downward movement of the hook $P^2$, thereby releasing the shipper $J^1$ so that it can be moved by hand to the left of Fig. 19 and returned by the operator to its locked position as shown in said figure. The lever O is then raised, partially turning the shaft F, when the cam $b^3$ acting upon the non-revoluble collar $a^4$ causes said shaft to be moved towards the right of Fig. 2 into the position shown in Fig. 2 compressing the springs $m^3$, $m^4$ and $m^5$, because the shipper arms $m$, $m^1$, and $m^2$ are prevented from being moved toward the right by the locking segments $o$, $o^1$ and $o^2$. The twine $y^3$ having been drawn from the spool $W^1$ over the sheave X, between the sheaves $X^1$—$X^1$ and through the eye of the arm S and its end made fast to the mandrel in the usual manner the machine is in condition to commence building a cop, by simply shipping the driving belt upon the tight pulley $B^1$.

With the parts of the machine in the positions above described, if motion is imparted to the shaft B, motion will be imparted to the cam shaft C through the gears $e$, $e^1$, the shaft E, and the gears $c^4$ and $c^5$, and to the shaft D through the gears $b$, $b^1$, shaft G, and the gears $h^2$, $i$, $i^1$, and $j$, having diameters relative to each other as hereinbefore stated, and as the gear $e$ on shaft B is only half the size of the gear $e^1$ on shaft E and the gear $c^4$ on shaft E is one-half the size of gear $c^5$ on shaft C, said shaft C and the cam L will make only one-eighth as many revolutions as the shaft G, thereby reciprocating the twine guiding arm S at such a speed relative to the revolutions of the shaft D as to wind the twine upon the mandrel in four convolutions to the length of the cop. This is continued, the twine making four convolutions in the length of the cop, reversing when the ends of the cop are reached and winding in the opposite direction the same number of convolutions to the length of the cop and in each direction laying the twine of one helix in near proximity to the preceding helix until a section of the desired diameter has been wound, and the roll $H^2$ has been raised, by the building up of the cop to a sufficient distance to rotate the shaft J until the locking segment $o^2$ is moved from engagement with the lug $n^2$, when the reaction of the spring $m^5$ moves the shipper arm $m^2$ and with it the clutch $K^1$ towards the right of Figs. 1 and 2, causing the clutch $K^1$ to be disengaged from the gear $e$, and engaged with the gear $d$. The gear $d$ being two-thirds the size of the gear $d^1$ on shaft E, the cam shaft C now rotates one-sixth the speed of the shaft G and causes the twine guiding arm to deliver the twine upon the cop in three convolutions to the length of the cop in each layer in building up the second section of the cop.

When the second section of the cop has been built up to the desired diameter, and the roll $H^2$ has been raised thereby a sufficient height to turn the shaft J about its axis to the point where the locking segment $o^1$ is removed from the path of the lug $n^1$, the reaction of the spring $m^4$ moves the shipper $m^1$ and the male clutch section $K^2$ towards the right of Figs. 1 and 2, causing said clutch portion $K^2$ to be disengaged from the gear $d^1$ on the shaft E and engaged with the gear $a^1$ on said shaft E, thereby connecting said gear $a^1$ to said shaft and causing said shaft to revolve therewith. The gear $a$ being fast on the shaft B and of equal diameter with the gear $a^1$ on the shaft E, the cam shaft C will make one revolution to four revolutions of the shaft G, and the twine guiding arm S will be reciprocated at such a speed relative to the revolutions of the mandrel or cop shaft D that the twine will be wound upon the cop in two convolutions in the length of the cop, which number of convolutions is maintained until the third section of the cop has reached the desired diameter.

When the roll $H^2$ has been moved upward by the building of the cop till the locking segment $o$ is removed from the path of the lug $n$ the reaction of the spring $m^3$ moves the shipper arm $m$ and the male clutch section K towards the right of Figs. 1 and 2, causing said clutch section to be disengaged from the gear $b$, rendering the gears $b$ and $b^1$ inoperative, and to engage with the gear $c$ causing it to revolve with the shaft B. Motion is now imparted from the shaft B to shaft G through gears $c$, $c^1$, $c^3$, $g$, $h$, and $h^1$, so proportioned that, whereas previously the shaft G made exactly two revolutions to one of the shaft B, both now rotate approximately alike, and since the rotations of the cam shaft C and cam L remain the same as when winding the third section of the cop said cam will now make substantially one-half the number of revolutions made by the shaft G and the twine will be wound upon the cop with one convolution in the length of the cop. Reducing the number of revolutions of the shaft G instead of increasing the speed of the cam shaft C to obtain the desired relative speeds of the cop shaft D and the twine guiding arm S reduces the liability of excessive wear of the cam L when high speeds are maintained, and permits the remainder of the cop to be wound with a slower circumferential speed, thereby producing a better finished product.

When the fourth section has reached the desired diameter the lever $v^3$ has been acted upon to move its lower end inward to a sufficient distance to disengage it from the shoulder $v$ of the lifter-toe $U^2$ when the force of gravity acting upon the weight W will cause the lifter toe to be moved about its axis in the direction indicated by the arrow on Fig. 6 until arrested by the shoulder $v^1$ coming in contact with the lower end of the lever $v^2$ thereby lifting the fulcrum bar U and the sleeve $T^2$ a distance equal to the throw of said lifter toe. This action, the changed length of traverse being properly determined, shortens the traverse of the twine guiding arm S which then delivers the twine upon the cop in such a manner that a band or section of less axial length than the previous sections is formed centrally upon the fourth section, made up of a series of layers each having the same number of helixes and each helix having the same number of convolutions as in the immediately preceding section of the cop, the helixes being closer together on account of the shortened space traversed by the twine guiding arm.

The band having reached the desired diameter the shoulder $w^1$ of the hook arm V passes beneath the shoulder $o^5$ of the arm $o^4$ thereby tripping the lever $v^2$ and allowing further movement of the lifter toe $U^2$ till the point of the lifter toe passes the roll $u^4$ and allows the fulcrum bar U to drop until the roll $u^4$ rests upon the lifter toe at the point $x$, whereby the traverse of the twine guiding arm S is lengthened causing the twine to be delivered upon the cop so as to completely inclose the ends of the band. Sometimes the number of wraps may be such on a section wound immediately prior to the shorter section wound thereon that when the traverse of the arm S is shortened, said wraps will crowd and possibly at times overlap, and therefore it may be desirable to wind the wraps of the said inner section farther apart than in the previously wound sections in which case it will be only necessary to shorten the distance traversed by the guide arm to wind another cop section.

While cops may be wound in sections by alternately changing the distance traversed by the guide arm S, the cop sections so formed are of unequal axial length in the same cop and cannot be so compactly wound nor contain as much twine in the same space as when wound as herein described.

In practice it has been found that when during the winding of a plurality of cop sections the number of rotations maintained by the winding shaft D is relatively one more than a number that is exactly divisible by the number of complete reciprocations meanwhile made by the guide arm S (the length of said reciprocations remaining unchanged throughout said layers), the several completed layers of double thickness of twine in such cop sections as are wound under these conditions in a cop will consist of the same maximum number of wraps of twine. To illustrate, as herein described, the shaft D rotates 121 times, or one more than 120, which latter number is exactly divisible by 15 the number of times the guide arm S is meanwhile reciprocated lengthwise of the cop during the winding of each completed layer of double thickness in the first cop section; by 20 the number of times said guide arm S is likewise reciprocated during the winding of each completed layer in the second cop section; and by 30 the number of times said guide arm S is in like manner reciprocated during the winding of each completed layer in the third cop section. In each completed layer of double thickness of twine of said cop sections 120 wraps of twine will be wound, said layers of the first cop section each consisting of 30 helixes each having four convolutions in its length upon the cop; said layers of the second cop section each consisting of 40 helixes each having three convolutions in its length upon the cop; and said layers of the third cop section each consisting of 60 helixes each having two convolutions in its length upon the cop.

When the gears $b$ and $b^1$ are inoperative, motion is imparted to shaft G through gears $c, c^1, c^3, g, h$ and $h^1$ which are so proportioned relative to each other that a different fixed ratio will be maintained between the relative rotations of the shafts B and G during the winding of the succeeding layers and since the gears by which said ratio is maintained are not connected with the shaft C it is obvious that any desired ratio may be established by properly proportioning said gears, as for instance said change or ratio may affect the number of rotations of the winding shaft causing the several layers to be wound thereafter at a decreased circumferential speed as heretofore described; said change of ratio may affect the number of helixes wound in each completed layer wound thereafter; said change of ratio may affect the number of helixes and the number of convolutions in each of said helixes in each of the completed layers wound thereafter; or said change of ratio may simultaneously include two or more of the above changes. The abrupt changes of ratio in the relative movements of the winding shaft and guide arm made when changing from one cop section to another may occur anywhere in the length of the cop and the degree of abruptness depends upon the rapidity of the movement of the mechanism for changing said ratio, and it also momentarily causes a slight deviation in the regularity of the winding, hence, for the purpose of description herein, when reference is made to the character of the winding, after a change, it refers to the portion that is wound when said ratio has become fixed.

When reference is made to a completed layer of double thickness of twine it refers to so much of the twine as is wound while the ratio is fixed, from the time the twine passes over a fixed point anywhere in the length of the body of the cop on its surface until it again passes in the same direction over the same fixed point but it does not necessarily begin and stop at one of the ends of the cop. Again when the word "number" is used to designate the number of windings or convolutions in a helix in its length upon the cop it refers to a close approximation to said number for it is evident that the number of convolutions in a helix cannot be exactly four, three, two or one but must be slightly more or less than the designated number to allow the twine in one helix to pass and lie in near proximity to the immediately preceding helix.

The pairs of gears $c$ and $c^1$, $d$ and $d^1$, $a$ and $a^1$, and $e$ and $e^1$ may be differently proportioned to make the number of convolutions in the axial length of the cop, in any section thereof, either an integer or a mixed number and they may be so arranged that the completed layers may consist of a larger or smaller number of convolutions in the axial length than in the immediately preceding or succeeding section, as for instance, the first section may have three convolutions, the second section two, the third section one and one-half, and the fourth section one, or two, convolutions in its axial length.

It will be seen that the bearing or inner surface of the free end of the twine guiding arm is so shaped and the arm is so mounted that in its traverse lengthwise of the mandrel it will readily mount the ends of the raised portions of the cop formed by the layers of narrower width wound thereon, and since the delivery eye is central of the convex surface thereof the point of delivery is always in close proximity to the surface of the cop during the winding. The area of contact is reduced to a minimum which is a desirable feature inasmuch as it decreases the chafing caused by the face of the guide arm rubbing and sliding against the cop, and further, the convex surface, relatively exposes the greatest surface to the cooling effect of the current of air circulating around the surface of the cop.

The link $P^1$ has adjustably connected thereto by means of the slotted plate $P^3$, the clamping screw $P^4$ and the guide pin $P^5$, the pivoted hook $P^2$ so constructed that when in its normal position as shown in Fig. 3 it will, as the cop is approaching completion or the desired diameter, engage the shipper rod $J^1$ and lift it to disengage the shoulder $a^7$ from the hub $a^5$ when the tension of the spring $a^9$ will move the shipper rod and ship the driving belt upon the loose pulley, not shown, and thus arrest the operation of the machine.

By moving the free end of the hook $P^2$ toward the front of the machine after the roll $H^2$ has been raised from contact with the cop and locked in such elevated position the shipper can be used to operate the machine while said roll is retained in such locked position. The hook $P^2$ need be in contact with the shipper arm $J^1$ only when the cop is approaching completion; and attaching said hook in an adjustable position permits mechanical arrest of the operation of the machine whenever desired. It is obvious that it can be so adjusted in a position as to limit the duration of the winding of a section differentiated from a previously wound cop section by change in the relative rate of movement of the guide arm or winding shaft; by change in the length of traverse of the guide; by shifting the winding shaft endwise; singly or two or more concurrently, and in the desired sequence such as described.

Claims.

1. In a twine winding machine, the combination of a positively driven mandrel; means for rotating the mandrel during the winding of a plurality of cop sections; a reciprocating twine guide coöperating with the cop during the winding; and means for maintaining the relative movements of the driving shaft and guide constructed and arranged to automatically change the relative rate of movement of said twine guide and said mandrel at predetermined times during the winding, each change of rate terminating a series of layers constituting a section of a cop.

2. In a twine winding machine, the combination of a driving shaft; a positively driven mandrel; a revoluble shaft carrying a cam thereon; a twine guide coöperating with the cop during the winding; means connecting said guide and cam and actuated by said cam to reciprocate said guide lengthwise of the mandrel; mechanism connecting the driving and cam shafts for automatically changing the relative rate of rotations of said driving and cam shafts at predetermined times during the winding; and mechanism connecting said mandrel and driving shaft for maintaining the relative rotations of said driving shaft and mandrel at a fixed ratio until a predetermined time, including devices effective at such time for automatically changing said rate to wind the layers added after said change upon the cop at a decreased circumferential speed relative to the layers in the cop section wound immediately before said change, each of said changes of rate terminating a series of layers.

3. In a twine winding machine, the combination of a positively driven shaft carrying a mandrel thereon; a reciprocating twine guide coöperating with the face of the cop during the winding; a driving shaft; mechanism interposed between said driving shaft and twine guide and between said driving shaft and mandrel for automatically changing the relative rate of movement of said mandrel and guide at predetermined times during the winding; and for maintaining the relative rotations of said mandrel and driving shafts at a fixed ratio until a predetermined time and then to automatically change said fixed ratio whereby the number of helixes in the completed layers of the cop section wound thereafter will be different from those previously wound while the number of convolutions in the length of the cop remains unchanged in the layers immediately preceding and succeeding said change of rate, each of said changes terminating a series of layers.

4. In a twine winding machine, the combination of a positively driven mandrel; a fixed rod; a twine guiding arm mounted upon and movable endwise of said fixed rod; a revoluble cam; a reciprocating carriage operated by said cam; a movable fulcrum pin; a two-armed lever connected at one end to said guide and at its other end to said reciprocating carriage and movable about said fulcrum pin; a vertically movable bar carrying said fulcrum pin; a cam or lifter toe supporting said bar; a weight connected to said lifter toe; means for locking said lifter toe against the descent of said weight; and means for tripping said locking device to permit the descent of said weight at a predetermined time, and thus automatically raise said bar and adjust the fulcrum of said two-armed lever and the traverse of the twine guiding arm.

5. In a twine winding machine, the combination of a winding mandrel; a reciprocating guide arm provided at its free end with a twine guiding eye bounded by a convex bearing surface; means for maintaining said bearing surface in contact with the cop with a yielding pressure; means for maintaining the relative movements of said mandrel and arm during the winding, said means including devices for automatically changing the relative rate of movement of said guide arm and winding mandrel at predetermined times, and means for automatically changing the length of traverse of said guide arm at predetermined times during the winding whereby cop-sections of different lengths may be wound upon the mandrel in building the same cop, each of said changes terminating a series of layers.

6. In a twine winding machine, the combination of a winding mandrel; a reciprocating guide arm provided at its free end with a delivery eye bounded by a convex bearing surface; means for maintaining said bearing surface with a yielding pressure in contact with the cop; and means for maintaining the relative movements of said mandrel and guide arm during the winding, said means including devices for automatically changing the relative rate of movement of said guide arm and winding mandrel at predetermined times, each change of said rate terminating a series of layers.

7. The combination in a twine winding machine, of a positively driven mandrel upon which the cop is to be wound; two fixed rods parallel to each other and extending longitudinally of said mandrel; levers each provided with a sleeve-like hub and mounted upon one of said rods; a roll cooperating with said cop mounted in bearings in the ends of the long arms of said levers; arms mounted loosely upon said hubs; a rod connecting the free ends of said arms; a pin set in the end of each of the short arms of said levers and limiting the movement of said arms; a twine guiding arm provided with a short arm having its end forked and engaging the rod connecting said arms; means for reciprocating said guide arm lengthwise of the mandrel or cop; and a spring coiled around each of said hubs and connected at one end to a stud or eye formed on said hub and its other end engaging the arm-connecting rod.

8. A cop winding mandrel for twine winding machines comprising the following elements: a shaft having a tapered flat-sided section of a somewhat greater length than the cop to be wound; a cylindrical section at each end of said tapered section of different diameters provided with a slot cut through the larger cylindrical section; a collar fitted to and movable endwise of said larger cylindrical section and provided with an annular lip projecting toward said tapered section and having an internal diameter greater than the internal diameter of the larger cylindrical section; a cylinder or sleeve having an inwardly projecting annular flange a short distance from its inner end, fitted to the smaller cylindrical section of said shaft; a collar or head secured to the end of said shaft and fitted to the bore of said cylinder; a spring surrounding said smaller section of said shaft between said collar or head and said inwardly projecting annular flange; and a plurality of lags segmental in cross section, and having their ends reduced in thickness and inclosed by the cylinder and the annular lip of the endwise movable collar inclosing the larger cylindrical section of said shaft.

9. In a twine winding machine, the combination of a revoluble mandrel shaft mounted in bearings so as to be movable longitudinally therein; means for locking said shaft in its normal position against endwise movement; a reciprocating twine guiding arm; a lever for reciprocating said arm said lever being provided with a movable fulcrum pin; a vertically movable fulcrum bar in which said movable fulcrum pin has its bearing; means for automatically raising said fulcrum bar to vary the traverse of said guiding arm; mechanism operated by the upward movement of said fulcrum bar for releasing said mandrel shaft; and a spring for moving said shaft when released endwise into such a position that the band or shorter section of the cop will be wound near one end of the main body of the cop instead of on the center thereof.

10. In a twine winding machine, the combination of a positively driven shaft; a mandrel carried by said shaft and upon which the twine is wound; a reciprocating twine guiding arm; a vertically movable fulcrum bar; a lever fulcrumed upon said bar and connected to said guiding arm; means for operating said lever; a pivoted support for said fulcrum bar; means for locking said support in its normal position; means for releasing said support; and mechanism for automatically moving said support about its axis when released to raise said fulcrum bar whereby the traverse of the guiding arm is reduced and layers of less length than the main body of the cop are wound centrally thereon.

11. In a twine winding machine, the combination of a positively driven shaft; a mandrel carried by said shaft and upon which the twine is wound; a reciprocating twine guiding arm; a vertically movable fulcrum bar; a lever fulcrumed upon said bar and connected to said guiding arm; means for operating said lever; a gravity operated pivoted support for supporting said fulcrum bar in three different positions; means for locking said support in its normal and raised position; mechanism for releasing said locking device whereby the traverse of the guiding arm is first shortened, and a band consisting of a plurality of layers of less length than the main body of the cop is laid thereon and then said traverse is lengthened to wind thereon the covering that extends beyond the ends of said band and completely incloses the same.

12. In a twine winding machine, the combination of a winding mandrel; a reciprocating twine guiding arm provided with a delivery eye; means for pressing said eye against the cop; and mechanism for driving said mandrel and guiding arm during the winding, said mechanism including devices for automatically changing the relative rate of movement of said mandrel and arm at predetermined times during the winding, each of said changes of rate terminating a series of layers, and said devices including adjustable means for varying the number of rotations of the mandrel per traverse of the guiding arm to regulate the number of helices wound in the layers of the several cop sections.

13. In a twine winding machine, the combination of a winding mandrel; a reciprocating twine guide provided with a delivery eye; means for pressing said eye against the cop; and means for driving said mandrel and guide including devices for automatically changing the relative rate of movement of said mandrel and guide at predetermined times during the winding, said devices including adjustable means effective at a predetermined time to vary the number of rotations of said winding mandrel whereby the relative movements of said mandrel and guide will be maintained at any desired rate during the winding of the layers wound thereafter, each change of said rate terminating a series of layers.

14. In a twine winding machine, the combination of a winding mandrel; a reciprocating twine guide provided with a delivery eye; means for pressing said eye against the cop; means for driving said mandrel and guide including devices for automatically changing the relative rate of movement of said mandrel and guide at predetermined times during the winding, and means for automatically changing the length of traverse of the guide at predetermined times during the winding whereby cop sections of different lengths may be wound upon the mandrel during the building of the same cop, each of said changes terminating a series of layers.

15. In a winding machine, the combination of a winding shaft movable endwise in its bearings; a winding mandrel on said shaft; a reciprocating twine guide provided with a delivery eye; means for pressing the eye against the cop; means for driving said shaft and guide including devices for automatically changing the relative rate of movement of said shaft and guide at predetermined times during the winding, and means for automatically moving said shaft at a predetermined time during the winding into another position in the direction of its length whereby layers of different cop sections may be wound upon predetermined portions of the winding mandrel of said shaft, said changes of rate and change of position of the shaft each terminating a series of layers.

16. In a twine winding machine, the combination of a winding shaft movable endwise in its bearings; a winding mandrel on said shaft; a reciprocating guide arm provided at its free end with a twine guiding eye bounded by a convex bearing surface; means for maintaining said convex bearing surface in contact with the cop with a yielding pressure; and means for driving said shaft and guide arm including devices for automatically changing the relative rate of movement of said shaft and guide arm at predetermined times during the winding and including means for automatically changing the position of said shaft in the direction of its length at a predetermined time and automatically changing the length of traverse of said guide arm at predetermined times during the winding whereby cop sections of different lengths may be wound upon predetermined portions of the mandrel of said winding shaft, each of said changes terminating a series of layers.

17. In a winding machine, the combination of a winding member; a reciprocating guide; and guide-moving devices, said devices including means for automatically changing the relative rate of movement of said winding member and guide at predetermined times during the winding, each of said changes terminating a series of layers.

18. In a winding machine, the combination of a winding member; a reciprocating guide; and guide-moving devices, said devices including means for automatically changing the length of traverse of the guide at appointed times during the winding, each of said changes terminating a series of layers.

19. In a winding machine, the combination of a winding member; a reciprocating guide; guide-moving devices, said devices including means for automatically changing the length of traverse of the guide at predetermined times during the winding, each of said changes terminating a series of layers; and means for returning said devices to their original positions.

20. In a winding machine, the combination of a winding member; a reciprocating guide; and guide-moving devices, said devices including means for automatically changing the relative rate of movement of said winding member and guide at predetermined times during the winding and automatically changing the length of traverse of the guide at predetermined times, said changes each terminating a series of layers.

21. In a winding machine, the combination of a winding member; a reciprocating guide; and guide-moving devices, said devices including means for automatically changing the length of traverse of the guide at predetermined times during the winding, and means for shifting the winding member endwise at a predetermined time into a position preparatory to a continuation of said winding, each of said changes terminating a series of layers.

22. In a winding machine, the combination of a winding member; a reciprocating guide; and guide-moving devices, said devices including means for automatically changing the relative rate of movement of said winding member and guide at predetermined times during the winding, and automatically changing the length of traverse of the guide at predetermined times during the winding, each of said changes terminating a series of layers, and means for shifting the winding member endwise at the termination of a series of layers constituting a cop section into a position preparatory to a continuation of said winding.

23. In a winding machine, the combination of a winding member; a reciprocating guide; guide-moving devices, said devices including means for automatically changing the relative rate of movement of said winding member and guide at predetermined times during the winding; and adjustable means effective at a predetermined time to vary the number of rotations of said winding member whereby the relative rate of movement of said member and guide will be maintained at any desired rate during the winding of the layers wound thereafter, each change of said ratio terminating a series of layers.

24. In a winding machine, the combination of a winding member; a reciprocating guide; guide-moving devices, said devices including means for automatically changing the relative rate of movement of said winding member and guide at predetermined times during the winding and automatically changing the length of traverse of the guide at a predetermined time, and means for mechanically shifting the winding member endwise at a predetermined time during the winding into a position preparatory to a continuation of said winding, each of said changes terminating a series of layers; and means for returning said devices to their original positions.

25. In a winding machine, the combination of a winding member; a reciprocating guide; guide-moving devices, said devices including means for automatically changing the relative rate of movement of said winding member and guide at predetermined times during the winding, each of said changes terminating a series of layers, and adjustable means for regulating the number of rotations of the winding member per traverse of the guide during the winding of a plurality of cop sections.

26. In a winding machine, the combination of a winding member; a reciprocating guide; and guide-moving devices, said devices including means for automatically changing the relative rate of movement of said winding member and guide at predetermined times during the winding, each of said changes terminating a series of layers, and means for shifting the winding member endwise at the termination of a series of layers into a position preparatory to a continuation of said winding.

27. In a winding machine, the combination of a winding member; a reciprocating guide; guide-moving devices, said devices including means for automatically changing the relative rate of movement of said winding member and guide at predetermined times during the winding, each of said changes terminating a series of layers; and means for returning said devices to their normal positions.

28. In a winding machine, the combination of a winding member; a reciprocating guide; guide-moving devices, said devices including means for automatically changing the relative rate of movement of said winding member and guide at predetermined times during the winding, each of said changes terminating a series of layers, and means for shifting the winding member endwise at the termination of a series of layers constituting a cop section into a position preparatory to a continuation of said winding; and means for returning said devices to their normal positions.

29. In a winding machine, the combination of a winding member; a reciprocating guide; guide-moving devices, said devices including means for automatically changing the relative rate of movement of said winding member and guide at predetermined times during the winding, said changes of said rate each terminating a series of layers; and means for adjusting the length of traverse of the guide to wind the series of layers forming the first cop section.

30. In a winding machine, the combination of a winding member; a reciprocating guide; guide-moving devices, said devices including means for automatically changing the relative rate of movement of said winding member and guide at predetermined times during the winding, said changes of said rate each terminating a series of layers; means for adjusting the length of traverse of the guide to wind the series of layers forming the first cop section; and means for returning said devices to their normal positions.

31. In a winding machine, the combination of a winding member; a reciprocating guide; guide-moving devices, said devices including means for automatically changing the relative rate of movement of said winding member and guide at predetermined times during the winding, each of said changes terminating a series of layers; devices for stopping the winding; and a member attached to the devices for changing the relative movements of the guide and winding member and coöperating with the stopping devices to automatically arrest the winding when the cop is completed.

32. In a winding machine, the combination of a winding member; a reciprocating guide; guide-moving devices, said devices including means for automatically changing the relative rate of movement of said winding member and guide at predetermined times during the winding, each of said changes terminating a series of layers; devices for stopping the winding; and an adjustable member attached to the devices for changing the relative movements of the guide and winding member and coöperating with the stopping devices to automatically arrest the winding when the cop is completed.

33. In a winding machine, the combination of a winding member; a reciprocating guide; guide-moving devices, said devices including means for automatically changing the relative rate of movement of said winding member and guide at predetermined times during the winding, each of said changes of rate terminating a series of layers; devices for stopping the winding; and a swinging member pivoted to the devices for changing the relative movements of the guide and winding member and coöperating with the stopping devices to automatically arrest the winding when the cop is completed and movable free from said engagement with the stopping devices when it is desired to start and stop the machine at any period of the winding.

34. In a winding machine, the combination of a winding member; a reciprocating guide; guide-moving devices, said devices including means for automatically changing the relative rate of movement of said winding member and guide at predetermined times during the winding, each of said changes of rate terminating a series of layers; devices for stopping the winding; and an adjustable member pivoted to the devices for changing the relative movements of the guide and winding member and coöperating with the stopping devices to automatically arrest the winding when the cop is completed and movable free from said engagement with the stopping devices when it is desired to start and stop the machine at any period of the winding.

35. In a winding machine, the combination of a winding member; a reciprocating guide; guide-moving devices, said devices including means for automatically changing the relative rate of movement of said winding member and guide at predetermined times during the winding, each of said changes of rate terminating a series of layers; devices for stopping the winding; a member attached to the devices for changing the relative movements of the guide and winding member and coöperating with the stopping devices to automatically arrest the winding when the cop is completed; and means for retaining the shipper mechanism in a position to prevent the accidental operation of the machine.

36. In a winding machine, the combination of a winding member; a reciprocating guide; guide-moving devices, said devices including means for automatically changing the relative rate of movement of said winding member and guide at predetermined times during the winding, each of said changes of rate terminating a series of layers; devices for stopping the winding; a member attached to the devices for changing the relative movements of the guide and winding member and coöperating with the stopping devices to automatically arrest the winding when the cop is completed; means for retaining the shipper mechanism in a position to prevent the accidental operation of the machine; and means for mechanically releasing said starting devices from said retained position.

37. In a winding machine, the combination of a winding member; a reciprocating guide; guide-moving devices, said devices including means for automatically changing the relative rate of movement of said winding member and guide at predetermined times during the winding, each of said changes of rate terminating a series of layers; devices for stopping the winding; a swinging member pivoted to the devices for changing the relative movements of the guide and winding member and coöperating with the stopping devices to automatically arrest the winding when the cop is completed; means for retaining the shipper mechanism in a position to prevent the accidental operation of the machine; and a plurality of mechanisms adapted to be operated independently of each other to release said shipper from said retained position.

38. In a winding machine, the combination of a winding member; a reciprocating guide; guide-moving devices; and means for retaining the winding member in one position during the winding of a series of layers and for then shifting said winding member endwise and retaining it in a different position in the direction of its length to continue said winding.

39. In a winding machine, the combination of a winding member; a reciprocating guide; guide-moving devices; means for retaining the winding member in one position during the winding of a series of layers and for then shifting said winding member endwise and retaining it in a different position in the direction of its length to continue said winding; including means for adjusting the initial position of said winding member.

40. In a winding machine, the combination of a winding member; a reciprocating guide; guide-moving devices; and means for retaining the winding member in one position during the winding of a series of layers and for then shifting said winding member endwise and retaining it in a different position in the direction of its length to continue said winding, said means including mechanism for limiting the extent of the endwise movement of said winding member.

41. In a winding machine, the combination of a winding member; a reciprocating guide; guide-moving devices; means for retaining the winding member in one position during the winding of a series of layers and for then shifting said winding member endwise and retaining it in a different position in the direction of its length to continue said winding; devices for stopping the winding; and a member attached to the devices for shifting said winding member and coöperating with the stopping devices to automatically arrest the winding when the cop is completed.

42. In a winding machine, the combination of a winding member; a reciprocating guide; guide-moving devices, said devices including means for automatically changing the length of traverse of the guide at predetermined times during the winding, each of said changes terminating a series of layers; devices for stopping the winding; and a member attached to the devices for changing the length of traverse of the guide and coöperating with the stopping devices to arrest the winding when the cop is completed.

43. In a winding machine, the combination of a winding member; a reciprocating guide; and guide-moving devices, said devices including means for changing the relative rate of movement of said winding member and guide at predetermined times during the winding, each of said changes terminating a series of layers.

44. In a winding machine, the combination of a winding member; a reciprocating guide; and guide-moving devices, said devices including means for changing the length of traverse of the guide at predetermined times during the winding, each of said changes terminating a series of layers.

In testimony whereof, I have signed my name to this specification in the presence of two subscribing witnesses, on this eighth day of February A. D. 1898.

CHARLES PAUL MITCHELL.

Witnesses:
N. C. LOMBARD,
H. T. CROSBY.